(12) United States Patent  
Uemura et al.

(10) Patent No.: US 8,377,508 B2  
(45) Date of Patent: Feb. 19, 2013

(54) SOLVENTLESS LAMINATING ADHESIVE AND PROCESS FOR PRODUCTION OF COMPOSITE FILM

(75) Inventors: Takashi Uemura, Yokohama (JP); Shigetoshi Sasano, Chiba (JP); Yasuhiko Kataoka, Omuta (JP)

(73) Assignee: Mitsui Chemicals, Inc., Tokyo (JP)

( * ) Notice: Subject to any disclaimer, the term of this patent is extended or adjusted under 35 U.S.C. 154(b) by 524 days.

(21) Appl. No.: 12/451,903

(22) PCT Filed: May 12, 2008

(86) PCT No.: PCT/JP2008/058737  
§ 371 (c)(1),  
(2), (4) Date: Dec. 4, 2009

(87) PCT Pub. No.: WO2008/149641  
PCT Pub. Date: Dec. 11, 2008

(65) Prior Publication Data  
US 2010/0119821 A1    May 13, 2010

(30) Foreign Application Priority Data  
Jun. 6, 2007  (JP) .................................. 2007-150671

(51) Int. Cl.  
*B05D 5/10* (2006.01)  
*C08F 26/02* (2006.01)

(52) U.S. Cl. .................. 427/208.2; 427/207.1; 526/301; 526/935

(58) Field of Classification Search .............. 427/207.1, 427/208.2; 526/935, 301; 428/423.1, 355 N  
See application file for complete search history.

(56) References Cited

U.S. PATENT DOCUMENTS

| | | | | |
|---|---|---|---|---|
| 3,915,935 | A | * | 10/1975 | Abraham et al. ................ 528/66 |
| 7,910,163 | B2 | * | 3/2011 | Zollner et al. ............. 427/207.1 |
| 2002/0143133 | A1 | | 10/2002 | Imai et al. |
| 2002/0157789 | A1 | | 10/2002 | Imai et al. |
| 2008/0308226 | A1 | | 12/2008 | Imai et al. |

FOREIGN PATENT DOCUMENTS

| | | |
|---|---|---|
| CN | 1740259 A | 3/2006 |
| JP | 60-55187 | 12/1985 |
| JP | 7-97557 | 4/1995 |
| JP | 2001-152066 | 6/2001 |
| JP | 2001-172602 | 6/2001 |
| JP | 2002-249745 | 9/2002 |
| JP | 2003-3145 | 1/2003 |
| JP | 2003-82324 | 3/2003 |
| JP | 2005-89734 | 4/2005 |
| JP | 2006-213801 | 8/2006 |
| WO | WO 2006/011256 A1 | 2/2006 |

OTHER PUBLICATIONS

International Search Report in corresponding International Application No. PCT/JP2008/058737.

* cited by examiner

*Primary Examiner* — Thao T. Tran  
(74) *Attorney, Agent, or Firm* — Foley & Lardner LLP

(57) ABSTRACT

A solventless laminating adhesive comprising a polyisocyanate component and a polyol component, both of which are free from polyol components exhibiting crystalline properties at ordinary temperatures. The adhesive exhibits an initial viscosity of 500 to 1000 mPa s three minutes after mixing of the polyisocyanate component with the polyol component and a viscosity increase of 100 to 350% based on the initial viscosity 20 minutes after the mixing. In a coater which is provided with a pair of opposed rolls and in which the rolls rotates in the directions contrary to each other at the opposition site, the adhesive is applied to a film passing between the rolls.

3 Claims, 2 Drawing Sheets

SOLVENTLESS LAMINATING ADHESIVE AND PROCESS FOR PRODUCTION OF COMPOSITE FILM

TECHNICAL FIELD

The present invention relates to a solventless laminating adhesive and a process for producing a composite film. More specifically, the present invention relates to a solventless laminating adhesive suitably used in order to produce a composite film, and a process for producing the composite film.

BACKGROUND ART

Composite films having a plurality of films adhesively bonded with a laminating adhesive are widely used in the field of packaging materials.

Two-part laminating adhesives composed of a base composition containing polyol and a curing agent containing polyisocyanate have been widely known hitherto.

In recent years, there has been studied the development of a two-part solventless laminating adhesive without containing any organic solvent from the viewpoints of reduction of environmental load and improvement of working environment.

For example, there has been proposed a solvent-free two-part curable adhesive composition containing a polyol component (A) and a polyisocyanate component (B), the composition having a viscosity of 900 mPa·s or more at 80° C. immediately after the components (A) and (B) are mixed together (see, for example, the following Patent Document 1).

Also, there has been proposed a solvent-free two-component curable adhesive composition containing a polyol component (A) and a polyisocyanate component (B), in which at least either component (A) or (B) contains at least one polyol component selected from the group consisting of a polyether polyol, a polycarbonate polyol, and a polyurethane polyol, and exhibiting crystallinity at room temperature; and a proportion of the crystalline polyol component is 3 to 50% by weight of the total weight of the components (A) and (B) (see, for example, the following Patent Document 2). The solvent-free two-component curable adhesive composition has a viscosity of 100 to 1500 mPa·s at 70° C. immediately after the components (A) and (B) are mixed together, and an increasing ratio of the viscosity after the composition is stood at 70° C. for 10 minutes is 120% or less relative to the viscosity immediately after the mixing.

Further, there has been proposed a two-part curable solventless adhesive, in which a base composition contains a polyol having an acid group and a secondary or tertiary terminal hydroxyl groups accounting for 30% or more of the entire terminal hydroxyl groups, and a curing agent contains an isocyanate group-terminated urethane prepolymer having an average functionality of 1.5 to 2.5 which is obtained by reaction of an aralkyl polyisocyanate and a polyol, and an aliphatic polyisocyanate, and/or a modified substance thereof (see, for example, the following Patent Document 3).

The two-part solventless laminating adhesive described above is obtained by mixing the base composition and the curing agent in a solventless laminating apparatus, and the mixture is coated onto a film which passes through between a pair of rolls each rotating in the same direction in opposed relation to each other. Subsequently, the film is adhesively bonded to the other film with a nip roller, to thereby produce a composite film.

Patent Document 1: Japanese Unexamined Patent Publication No. 2001-172602
Patent Document 2: Japanese Unexamined Patent Publication No. 2002-249745
Patent Document 3: Japanese Unexamined Patent Publication No. 2006-213801

DISCLOSURE OF THE INVENTION

Problems to be Solved

However, when, in the solventless laminating apparatus the mixture of the base composition and the curing agent is coated onto the film with the pair of rolls each rotating in the same direction in opposed relation to each other, air is inadvertently entrapped during coating due to air entrainment, so that minute air bubbles may be generated in the adhesive layer of the composite film. Moreover, it has been known that, on the downstream side of the pair of rolls in the film transport direction, a paddle-like stringing phenomenon occurs between the surfaces of the rolls which are spaced apart from each other. When such stringing phenomenon occurs, the film surface coated with the adhesive may be damaged, resulting in formation of a minute void in the adhesive layer of the composite film.

In the meantime, even if the two-part solventless laminating adhesive does not contain any organic solvent, its viscosity needs to be low enough to enable coating. Therefore, as compared with the case of blending an organic solvent into the adhesive, the average molecular weights of the base composition and the curing agent in the two-part solventless laminating adhesive must be significantly low. The small average molecular weights of the base composition and the curing agent make an initial cohesive force weak, so that the adhesive needs to be aged for several days in order to exhibit adhesive strength. During the aging, air bubbles and minute voids existing in the adhesive layer move, gather, and develop. As a result, a spot-like (matte or orange peel-like) appearance of the composite film is disadvantageously formed. In particular, such disadvantage is apparent in a film having excellent gas barrier property because entrapped air bubbles are difficult to remove.

On the other hand, there is a process of coating the two-part solventless laminating adhesive at high temperature so as to increase the average molecular weights of the base composition and the curing agent to some extent. However, when the adhesive is coated at high temperature, damage to the film cannot be avoided.

When the coating speed is increased in order to improve productivity, a stringy adhesive generated by the above-mentioned stringing phenomenon is torn into pieces during the coating, and the torn adhesive pieces are then scattered into air to cause a large quantity of mist, resulting in significant deterioration of the working environment.

It is an object of the present invention to provide a solventless laminating adhesive capable of avoiding poor appearance of a composite film adhered with the adhesive although it is a solventless laminating adhesive, coating while reducing damage to a film, and further improving productivity while preventing deterioration of the working environment, and a process for producing a composite film using the solventless laminating adhesive.

Means for Solving the Problem

The solventless laminating adhesive of the present invention contains a polyisocyanate component and a polyol component, both of which are free from polyol components exhibiting crystallinity at room temperature; has an initial viscosity of 500 to 1000 mPa·s three minutes after the polyisocyanate component and the polyol component are mixed, and a viscosity increase of 100% to 350% relative to the initial viscosity 20 minutes after the mixing; and in a coating apparatus provided with a pair of rolls opposed to each other, each of the rolls rotating in an opposite direction in the opposed portion, is coated onto a film passing through between the rolls.

In the solventless laminating adhesive of the present invention, it is preferable that the film is coated at 40 to 80° C.

In the solventless laminating adhesive of the present invention, it is preferable that a coating speed of the film is 150 m/minute or higher.

In the solventless laminating adhesive of the present invention, it is preferable that the polyisocyanate component contains a urethane prepolymer having an isocyanate group at its molecular terminal and having a number average molecular weight of 450 to 2000, and the polyol component contains a polyester polyol having a number average molecular weight of 100 to 2000.

A process for producing a composite film according to the present invention, in a coating apparatus provided with a pair of rolls opposed to each other, each of the rolls rotating in an opposite direction in the opposed portion, a solventless laminating adhesive containing a polyisocyanate component and a polyol component, both of which are free from polyol components exhibiting crystallinity at room temperature; and having an initial viscosity of 500 to 1000 mPa·s three minutes after the polyisocyanate component and the polyol component are mixed, and a viscosity increase of 100% to 350% relative to the initial viscosity 20 minutes after the mixing, is coated onto a film passing through between the rolls.

In the process for producing a composite film according to the present invention, it is preferable that the film is coated at 40 to 80° C.

In the process for producing a composite film according to the present invention, it is preferable that a coating speed of the film is 150 m/minute or higher.

Effect of the Invention

In the process for producing a composite film according to the present invention, the solventless laminating adhesive of the present invention is coated onto a film with a pair of rolls rotating in the opposite direction to each other. Therefore, during the coating, a shearing force applied by the pair of rolls can reduce occurrence of air bubbles and can prevent occurrence of a stringing phenomenon.

The solventless laminating adhesive of the present invention has an initial viscosity of 500 to 1000 mPa·s three minutes after a polyisocyanate component and a polyol component are mixed, and a viscosity increase of 100% to 350% relative to the initial viscosity 20 minutes after the mixing. For this reason, coating can be performed at low temperature and high speed with the pair of rolls rotating in the opposite direction to each other.

Therefore, although the adhesive is a solventless laminating adhesive, poor appearance of the composite film adhered with such adhesive can be avoided. Besides, since the coating can be performed at low temperature, damage to the film can be reduced during the coating. Further, since the coating can be performed at high speed, productivity can be improved and deterioration of the working environment resulting from mist can be prevented.

EMBODIMENT OF THE INVENTION

Figure 1:
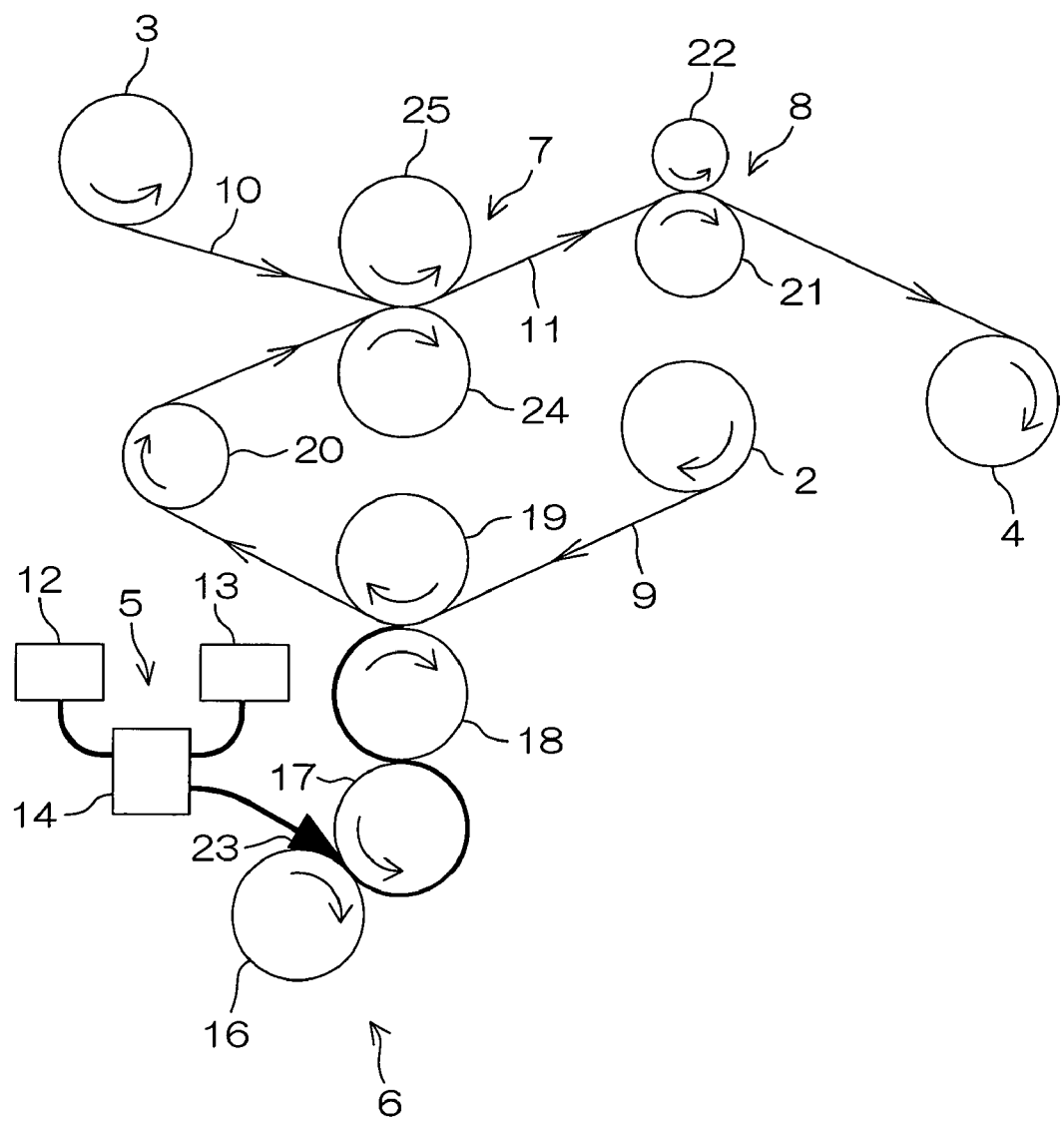
FIG. 1 is a schematic explanatory view showing a solventless laminator adopting a reverse system serving as a coating apparatus, which is used for applying a solventless laminating adhesive according to the present invention.

The solventless laminating adhesive of the present invention, which is two components type, contains a polyisocyanate component and a polyol component.

Examples of the polyisocyanate component include polyisocyanate monomers and derivatives thereof, and urethane prepolymers.

The polyisocyanate monomers that may be used include, for example, aromatic diisocyanate, aralkyl diisocyanate, alicyclic diisocyanate, and aliphatic diisocyanate.

The aromatic diisocyanate that may be used includes, for example, m- or p-phenylene diisocyanate or mixtures thereof, 2,4- or 2,6-tolylene diisocyanate or mixtures thereof (TDI), 4,4'-, 2,4'- or 2,2'-diphenylmethane diisocyanate or mixtures thereof (MDI), 4,4'-toluidine diisocyanate (TODI), 4,4'-diphenyletherdiisocyanate, 4,4'-diphenyl diisocyanate, and 1,5-naphthalene diisocyanate (NDI).

The aralkyl diisocyanate that may be used includes, for example, 1,3- or 1,4-xylylene diisocyanate or mixtures thereof (XDI), 1,3- or 1,4-tetramethylxylylene diisocyanate or mixtures thereof (TMXDI), and ω,ω'-diisocyanate-1,4-diethylbenzene.

The alicyclic diisocyanate that may be used includes, for example, 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (isophorone diisocyanate; IPDI), 4,4'-, 2,4'- or 2,2'-dicyclohexylmethane diisocyanate or mixtures thereof (hydrogenated MDI), methyl-2,4-cyclohexane diisocyanate, methyl-2,6-cyclohexane diisocyanate, and 1,3-, 1,4-bis(isocyanatomethyl)cyclohexane or mixtures thereof (hydrogenated XDI).

The aliphatic diisocyanate that may be used includes, for example, trimethylene diisocyanate, tetramethylene diisocyanate, hexamethylene diisocyanate (HDI), pentamethylene diisocyanate, 1,2-, 2,3- or 1,3-butylene diisocyanate, and 2,4,4- or 2,2,4-trimethyl hexamethylene diisocyanate.

The derivatives of the polyisocyanate monomers that may be used include, for example, multimers (dimers, trimers, pentamers, septamers, etc.) of polyisocyanate monomers, biuret-modified polyisocyanates (e.g., biurets produced by reaction of the polyisocyanate monomers with water), allophanate-modified polyisocyanates (e.g., allophanates produced by reaction of the polyisocyanate monomers with monol or polyol components (described later)), urea-modified polyisocyanates (e.g., ureas produced by reaction of the polyisocyanate monomers with diamines), oxadiazinetrione-modified polyisocyanates (e.g., oxadiazinetriones produced by reaction of the polyisocyanate monomers with carbon dioxide), and carbodiimide-modified polyisocyanates (carbodiimides produced by decarboxylation condensation reaction of the polyisocyanate monomers). In the derivatives of the polyisocyanate monomers, as the polyisocyanate monomer, alicyclic diisocyanate and aliphatic diisocyanate are preferable, or HDI is more preferable.

The urethane prepolymer is a urethane prepolymer having an isocyanate group at its molecular terminal, and can be obtained by urethane reaction of the polyisocyanate monomer and the polyol component (described later) at such a ratio that the equivalent ratio (NCO/OH) of the isocyanate group of the polyisocyanate monomer to the hydroxyl group of the polyol component is more than 1, or preferably 2 to 100. The urethane reaction can be performed according to a known process, and preferably, polyisocyanate monomers left unreacted are removed by a known removing process, such as subjecting to thin-film distillation.

In the urethane prepolymer, as the polyisocyanate monomer, aromatic diisocyanate and aralkyl diisocyanate are preferable, or MDI and XDI are more preferable. The polyol component that may be used preferably includes polyester polyol and polyether polyol which does not exhibit crystallinity at room temperature. The urethane prepolymer has a number average molecular weight of, for example, 450 to 2000, or preferably 500 to 1500. The number average molecular weight of the polyisocyanate component can be calculated from the isocyanate equivalent weight and the isocyanate functionality.

The polyisocyanate component is one kind or two or more kinds selected from the polyisocyanate monomers, derivatives thereof, and urethane prepolymers. The polyisocyanate component preferably contains a derivative of the polyisocyanate monomer and/or a urethane prepolymer, or more preferably contains at least a urethane prepolymer. Specific examples thereof include the combination use of at least one kind selected from trimers and biuret-, allophanate-, and urea-modified polyisocyanates, and a urethane prepolymer. More specific examples thereof include the combination use of at least one kind selected from trimers and allophanate-modified polyisocyanates, and a urethane prepolymer. In this case, as for the amount of the modified polyisocyanate and the urethane prepolymer to be blended, the amount of the modified polyisocyanate is, for example, 5 to 300 parts by weight, or preferably 10 to 100 parts by weight, per 100 parts by weight of the urethane prepolymer.

The isocyanate equivalent weight of the polyisocyanate component is, for example, 150 to 750, or preferably 200 to 500. The isocyanate equivalent weight can be obtained by amine titration.

The polyol component is not particularly limited as long as it is not a component exhibiting crystallinity at room temperature, and preferred examples thereof include polyester polyols, polyether polyols, and polyurethane polyols.

Examples of the component exhibiting crystallinity at room temperature include polyethylene adipate or polybutylene adipate having a number average molecular weight of 1000 or more, polyoxytetramethylene ether glycol having a number average molecular weight of 1000 or more, polyethylene glycol having a number average molecular weight of 1000 or more, and polyethylene polypropylene glycol (ethyleneoxide-propyleneoxide block copolymer: ethylene oxide content of 80% by weight or more) having a number average molecular weight of 3000 or more.

The polyester polyol can be obtained by a condensation reaction between a polybasic acid and a polyhydric alcohol, or a transesterification reaction between an alkyl ester of a polybasic acid and a polyhydric alcohol.

Examples of the polybasic acid include an aliphatic polycarboxylic acid such as succinic acid, glutaric acid, adipic acid, pimelic acid, cork acid, azelaic acid, sebacic acid, dodecanoic acid, and dimer acid; an alicyclic polycarboxylic acid such as hexahydrophthalic acid and tetrahydrophtalic acid, and an aromatic polycarboxylic acid such as phthalic acid, isophthalic acid, terephthalic acid, trimellitic acid, and pyromellitic acid.

Examples of the alkyl ester of the polybasic acid include C1-4 alkyl esters of the polybasic acids mentioned above.

Examples of the polyhydric alcohol include an aliphatic diol, an alicyclic diol, an aromatic diol, and a polyfunctional polyol.

Examples of the aliphatic diol include ethylene glycol, diethylene glycol, triethylene glycol, propylene glycol, dipropylene glycol, tripropylene glycol, 1,4-butanediol, 1,3-butanediol, 1,2-butanediol, 2-methyl-1,3-propanediol, 1,5-pentanediol, 3-methyl-1,5-pentanediol, 2,4-diethyl-1,5-pentanediol, 2,2,4-trimethylpentane-1,3-diol, 1,6-hexandiol, neopentyl glycol, 1,5-heptanediol, 1,7-heptanediol, 3,3'-dimethylolheptane, 1,8-octanediol, 1,9-nonanediol, 1,10-decanediol, 1,11-undecanediol, 1,12-undecanediol, 12-hydroxystearyl alcohol, and a hydrogenated dimer diol.

Examples of the alicyclic diol include hydrogenated bisphenol A, hydrogenated xylylenediol, cyclohexanediol, and cyclohexanedimethanol.

Examples of the aromatic diol include bisphenol A, bishydroxyethylterephthalate, catechol, resorcinol, hydroquinone, and 1,3- or 1,4-xylylenediol.

Examples of the polyfunctional polyol include a polyol having three or more hydroxyl groups, such as glycerin, trimethylolpropane, pentaerythritol, and sorbitol.

The condensation reaction or the transesterification reaction can be performed according to a known process without any particular limitation, and for example, the respective components are charged, and the mixture was allowed to react at 150 to 240° C. for 7 to 50 hours. A known catalyst (e.g., a titanium catalyst, a zinc catalyst, etc.) may be used for such reaction.

The polyester polyol has a number average molecular weight of, for example, 100 to 2000, or preferably 200 to 1500. The number average molecular weight of the polyol component can be calculated from the hydroxyl equivalent weight which is obtained by titration and the hydroxyl functionality.

It is preferable that the polyester polyol has an acid group. Examples of the acid group include a carboxylic acid group, a sulfonic acid group, a phosphoric acid group, or metal salts thereof. Among them, a carboxylic acid group is preferable.

The proportion of the acid group is 0.3% (% by mole, the same applies to the following.) or more and less than 20%, preferably 0.4% or more, or more preferably 0.5% or more and less than 15%, of the total of the entire terminal hydroxyl groups in the polyester polyol. When the proportion of the acid group is set to 0.3% or more, adhesive strength can be improved. On the other hand, when the proportion of the acid group is set to less than 20%, a significant increase in viscosity during blending of the polyisocyanate component and the polyol component can be suppressed.

The polyester polyol having an acid group can be obtained, for example, by allowing an acid anhydride to react with a terminal hydroxyl group of a polyester polyol to thereby acid-modify the polyester polyol, or by synthesizing a polyester polyol using a polyhydric alcohol having an acid group (e.g., dimethylol propionic acid, dimethylolbutanoic acid, etc.) as one of the raw material components. Such introduction of the acid group can improve adhesive strength. The polyester polyol having an acid group can be obtained preferably by allowing an acid anhydride to react with a terminal hydroxyl group of a polyester polyol to thereby acid-modify the polyester polyol.

The acid anhydride that may be used for the modification includes, for example, trimellitic anhydride, phthalic anhydride, maleic anhydride, and pyromellitic anhydride. Among them, trimellitic anhydride is preferable.

The acid modification ratio with the acid anhydride is determined according to the proportion of the acid group described above, and more specifically, the amount of the acid anhydride is 1.5 parts by weight or more and less than 10 parts by weight, preferably 2 parts by weight or more and less than 5 parts by weight, or more preferably 2.2 parts by weight or more and less than 5 parts by weight, per 100 parts by weight of the polyester polyol to be acid-modified.

The terminal hydroxyl group is modified by the acid anhydride, for example, by blending an acid anhydride with a polyester polyol at the above-mentioned ratio, and the mixture is allowed to react at 100 to 200° C. This introduces an acid group into the molecular terminal of the polyester polyol. For this reaction, if necessary, the above-mentioned polyhydric alcohol may be allowed to react with the acid anhydride.

Examples of the polyether polyol which does not exhibit crystallinity at room temperature include polypropylene glycols, polyethylene glycols having a number average molecular weight of 200 or less, and polyethylene polypropylene glycol (ethyleneoxide-propyleneoxide block copolymer: ethylene oxide content of 50% by weight or less) having a number average molecular weight of 3000 or less. Among them, polypropylene glycol is preferable.

The polyurethane polyol can be obtained by urethane reaction of the above-mentioned polyisocyanate monomer with the above-mentioned polyester polyol and/or the polyether polyol that does not exhibit crystallinity at room temperature at such a ratio that the equivalent ratio (NCO/OH) of the isocyanate group of the polyisocyanate monomer to the hydroxyl group of the polyester polyol and/or the polyether polyol is less than 1. In the polyurethane polyol, as the polyisocyanate monomer, aromatic diisocyanate and aralkyl diisocyanate are preferable. The polyurethane polyol has a number average molecular weight of, for example, 400 to 5000, or preferably 600 to 3000.

The polyol component is one kind or two or more kinds selected from the polyester polyol, the polyether polyol that does not exhibit crystallinity at room temperature, and the polyurethane polyol.

For example, a silane coupling agent, an oxyacid of phosphorus, or its derivative can be blended with either or both of the polyisocyanate component and the polyol component as required.

The silane coupling agent that may be used is represented, for example, by the structural formula: R—Si≡(X)$_3$ or R—Si≡(R') (X)$_2$ (wherein R represents an organic group having a vinyl, epoxy, amino, imino, isocyanate, or mercapto group; R' represents a lower alkyl group; and X represents a methoxy or ethoxy group, or chlorine atom.)

Specific examples of the silane coupling agent include chlorosilanes such as vinyl trichlorosilane; aminosilanes such as N-β-(aminoethyl)-γ-aminopropyltrimethoxysilane, γ-aminopropyltriethoxysilane, N-β-(aminoethyl)-γ-propylmethyldimethoxysilane, n-(dimethoxymethylsilylpropyl)ethylenediamine, n-(triethoxysilylpropyl)ethylenediamine, and N-phenyl-γ-aminopropyl trimethoxysilane; epoxysilanes such as γ-glycidoxypropyltrimetoxysilane, γ-glycidoxypropyltriethoxysilane, β-(3,4-epoxycyclohexyl)ethyltrimethoxysilane, and di(γ-glycidoxypropyl)dimethoxysilane; vinyl silanes such as vinyltriethoxysilane; and isocyanate silanes such as 3-isocyanatopropyltrimethoxysilane and 3-isocyanatepropyltriethoxysilane.

These silane coupling agents can be used alone or in combination of two or more kinds. The amount of the silane coupling agent is, for example, 0.001 to 10 parts by weight, or preferably 0.01 to 5 parts by weight, per 100 parts by weight of the polyisocyanate component and the polyol component.

In the oxyacids of phosphorus or its derivative, the oxyacids of phosphorus that may be used includes, for example, phosphoric acids, such as phosphinic acid, phosphorous acid, orthophosphoric acid, and hypophosphoric acid; and condensed phosphoric acid, such as metaphosphoric acid, pyrophosphoric acid, tripoliphosphoric acid, polyphosphoric acid, and ultraphosphoric acid.

The derivatives of the oxyacids of phosphorus that may be used include, for example, salts such as sodium salts and potassium salts, of phosphoric acids or condensed phosphoric acids; monoesters such as monomethyl orthophosphate, monoethyl orthophosphate, monopropyl orthophosphate, monobutyl orthophosphate, mono-2-ethylhexyl orthophosphate, monophenyl orthophosphorate, monomethyl phosphite, monoethyl phosphite, monopropyl phosphite, monobutyl phosphite, mono-2-ethylhexyl phosphite, and monophenyl phosphite; di- and triesters such as di-2-ethylhexyl orthophosphate, diphenyl orthophosphate, trimethyl orthophosphate, trietyl orthophosphate, tripropyl orthophosphate, tributyl orthophosphate, tri-2-ethylhexyl orthophosphate, triphenyl orthophosphate, dimethyl phosphite, diethyl phosphite, dipropyl phosphite, dibutyl phosphite, di-2-ethylhexyl phosphite, diphenyl phosphite, trimethyl phosphite, triethyl phosphite, tripropyl phosphite, tributyl phosphite, tri-2-ethylhexyl phosphite, and triphenyl phosphite; or mono-, di- and triesters obtained from condensed phosphoric acids and alcohols.

These oxyacids of phosphorus or their derivatives can be used alone or in combination of two or more kinds. Among them, those having at least one free oxyacid, such as orthophosphoric acids and polyphosphoric acids, are preferable. The amount of the oxyacid of phosphorus or its derivative to be blended is, for example, 0.001 to 3 parts by weight, or preferably 0.01 to 2.5 parts by weight, per 100 parts by weight of the polyisocyanate component and the polyol component.

Further, additives such as epoxy resins, catalysts, coating improving agents, leveling agents, antifoaming agents, stabilizers including antioxidant and ultraviolet absorbers, plasticizers, surfactants, pigments, fillers, organic or inorganic fine particles, and antifungal agents may be blended with either or both of the polyisocyanate component and the polyol component as required. The amount of these additives to be blended is appropriately determined according to the purposes and applications.

The solventless laminating adhesive of the present invention is prepared so as to have an initial viscosity of 500 to 1000 mPa·s three minutes after the polyisocyanate component and the polyol component are mixed and a viscosity increase of 100 to 350% relative to the initial viscosity 20 minutes after the mixing.

The above-mentioned viscosity is the one at the coating temperature (40 to 80° C.) to be described later, and specifically, can be determined according to the viscosity at 60° C.

When the initial viscosity three minutes after the mixing is less than 500 mPa·s, the low viscosity disadvantageously causes poor transfer (insufficient amount of coating) of the adhesive. Further, when it exceeds 1000 mPa·s, the high viscosity disadvantageously causes poor transfer (poor appearance of blur and streaks) of the adhesive. However, when the initial viscosity three minutes after the mixing is within the range of 500 to 1000 mPa·s, such disadvantages do not occur, and the adhesive can be uniformly coated to thereby achieve good appearance.

On the other hand, when the viscosity increase is less than 100% relative to the initial viscosity 20 minutes after the mixing, the curing property of the adhesive is deteriorated, and when it exceeds 350%, the adhesive thickens to damage the coating property. However, when the viscosity increase is within the range of 100 to 350% relative to the initial viscosity 20 minutes after the mixing, the curing property and the coating property of the adhesive can be simultaneously satisfied.

The polyisocyanate component and the polyol component are prepared at such a ratio that, in the mixing ratio, the equivalent ratio (NCO/OH) of the isocyanate group of the polyisocyanate component to the hydroxyl group of the polyol component is, for example, 0.5 to 5.0, or preferably 0.8 to 4.0.

The solventless laminating adhesive of the present invention, which serves as a two-part solventless laminating adhesive including the polyisocyanate component as a curing agent and the polyol component as a base composition, is coated on a film by a solventless laminator adopting a reverse system.

FIG. 1 is a schematic explanatory view showing a solventless laminator adopting a reverse system serving as a coating apparatus, which is used for coating a solventless laminating adhesive according to the present invention.

The solventless laminator 1 includes a first delivery roll 2, a second delivery roll 3, a take-up roll 4, a feed unit 5, a coating unit 6, a laminating unit 7, and a cooling unit 8.

A long length of first film 9 onto which the solventless laminating adhesive (hereinafter referred to as an adhesive 23) of the present invention is coated is wound around a surface of the first delivery roll 2.

A second film 10 laminated on the surface of the first film 9 having the adhesives 23 coated thereon is wound around a surface of the second delivery roll 3.

The take-up roll 4 winds up a composite film 11 having the first film 9 laminated on the second film 10.

The feed unit 5 includes a curing agent tank 12, a base composition tank 13, and a mixer 14. A curing agent, that is, a polyisocyanate component, is stored in the curing agent tank 12. A base resin, that is, a polyol component, is stored in the base resin tank 13. The curing agent tank 12 and the base composition tank 13 each are coupled to the mixer 14. In the mixer 14, the curing agent and the base composition supplied from the curing agent tank 12 and the base composition tank 13, respectively, are mixed.

The coating unit 6 is arranged between the first delivery roll 2 and the laminating unit 7 in the transport direction of the first film 9. The coating unit 6 includes a doctor roll 16, a metering roll 17, a coating roll 18, and an impression roll 19.

The doctor roll 16 is arranged on the upstream-most side (the "upstream side" and the "downstream side" in the coating unit 6 are relative to the direction of flow of the adhesive 23) in the coating unit 6.

The metering roll 17 is arranged on the downstream side of the doctor roll 16 in opposed relation to the doctor roll 16 so as to be in contact therewith. The metering roll 17 rotates in the same direction as the doctor roll 16 in the portion contacting with the doctor roll 16.

The coating roll 18 is arranged on the downstream side of the metering roll 17 in opposed relation to the metering roll 17 so as to be in contact therewith. The coating roll 18 rotates in the same direction as the metering roll 17 in the portion contacting with the metering roll 17.

The impression roll 19 is arranged in opposed relation to the coating roll 18 so as to be in contact therewith. The impression roll 19 rotates in the opposite direction (the same direction as the transport direction of the first film 9) to the coating roll 18 in the portion contacting with the coating roll 18.

The laminating unit 7 is arranged on the downstream side in the transport direction of the first film 9 with respect to the coating unit 6 and on the downstream side in the transport direction of the second film 10 with respect to the second delivery roll 3. The laminating unit 7 includes a laminating roll 24 and a nip roll 25.

The laminating roll 24 and the nip roll 25 are arranged in opposed relation to each other so as to be in contact with each other. Further, the laminating roll 24 and the nip roll 25 each rotate in the same direction in the contacting portion therebetween.

In the transport direction of the first film 9, a tension roller 20 is arranged between the coating unit 6 and the laminating unit 7.

The cooling unit 8 is arranged between the laminating unit 7 and the take-up roll 4 in the transport direction of the composite film 11. The cooling unit 8 includes a cooling roller 21 and a driven roller 22. The cooling roller 21 and the driven roller 22 are arranged in opposed relation to each other so as to be in contact therebetween. Further, the cooling roller 21 and the driven roller 22 each rotate in the same direction in the contacting portion therebetween.

In the solventless laminator 1, the curing agent stored in the curing agent tank 12 and the base composition stored in the base composition tank 13 are first supplied to the mixer 14. In the mixer 14, the curing agent and the base composition are mixed to prepare the adhesive 23.

Then, in the coating unit 6, the adhesive 23 is supplied between the doctor roll 16 and the metering roll 17 each rotating in the same direction. The supplied adhesive 23 is transferred onto the metering roll 17. Subsequently, the adhesive 23 passes through between the metering roll 17 and the coating roll 18 each rotating in the same direction, and is then transferred onto the coating roll 18.

On the other hand, the first film 9 delivered from the first delivery roll 2 is transported between the coating roll 18 and the impression roll 19 in the coating unit 6.

Therefore, the adhesive 23 transferred on the coating roll 18 is coated from the coating roll 18 rotating in the opposite direction with respect to the transport direction of the first film 9, to the first film 9 passing through between a pair of rolls, namely the coating roll 18 and the impression roll 19, which rotate in the opposite direction to each other in the portion (opposed portion) contacting therebetween.

Subsequently, the first film 9 coated with the adhesive 23 passes the tension roller 20, and is then transported between the laminating roll 24 and the nip roll 25 in the laminating unit 7. On the other hand, the second film 10 delivered from the second delivery roll 3 is transported between the laminating roll 24 and the nip roll 25 in the laminating unit 7. Therefore, the first film 9 and the second film 10 are adhered through the adhesive 23 between the laminating roll 24 and the nip roll 25 each rotating in the same direction, and the adhered films are then turned into the composite film 11 to be delivered out between these rolls.

Thereafter, in the cooling unit 8, the composite film 11 passes through between the cooling roller 21 and the driven roller 22, and cooled while passing. Finally, the cooled film is transported to the take-up roll 4 to be wound up.

In the solventless laminator 1, the time after the adhesive 23 is prepared by the mixer 14 until it is coated onto the first film 9 is, for example, 0.5 to 20 minutes, or preferably 1 to 10 minutes.

In the solventless laminator 1, the coating temperature of the adhesive 23 applied on the first film 9 is, for example, 40 to 80° C., or preferably 50 to 70° C. The coating temperature is determined by the preset temperature of the coating roll 18. More specifically, the temperature in the feed unit 5 is controlled so that the curing agent tank 12, the base composition tank 13, and the mixer 14 are set to the coating temperature.

The temperature in the coating unit 6 is also controlled so that the doctor roll 16, the metering roll 17, the coating roll 18, and the impression roll 19 are set to the coating temperature. Thus, the adhesive 23 is coated onto the first film 9 at the preset temperature of the coating roll 18. When the coating temperature is within the above range, damage to the first film 9 due to heat can be minimized.

Incidentally, when the adhesive 23 is coated onto the first film 9 from the coating roll 18, the surface temperature of the coating roll 18 may rise due to friction. In order to prevent such temperature rise, the coating roll 18 is provided with cooling means (e.g., a conduit for distributing warm water to the coating roll 18).

The coating speed of the first film 9 is, for example, 150 m/minute or higher. When the coating speed is within the above range, improved appearance and productivity of the composite film 11 may be compatible.

In the solventless laminator 1, the amount of the adhesive 23 coated on the first film 9 is, for example, 0.5 to 5.0 $g/m^2$, or preferably 0.8 to 4.0 $g/m^2$. When the coating amount is less than 0.5 $g/m^2$, adhesiveness is not sufficiently exhibited, which may result in poor appearance. On the other hand, when the coating amount exceeds 5.0 $g/m^2$, the adhesive 23 may leak out from the end portion of the composite film 11, which may deteriorate the quality of the composite film 11.

Other coating conditions employed in the solventless laminator 1 may be common and can be appropriately set.

In the solventless laminator 1, the coating roll 18 and the impression roll 19 are not limited to the above-mentioned type as long as they can rotate in the opposite direction to each other, and various types can be used without limitation of the number of rolls or their arrangement.

Figure 2:
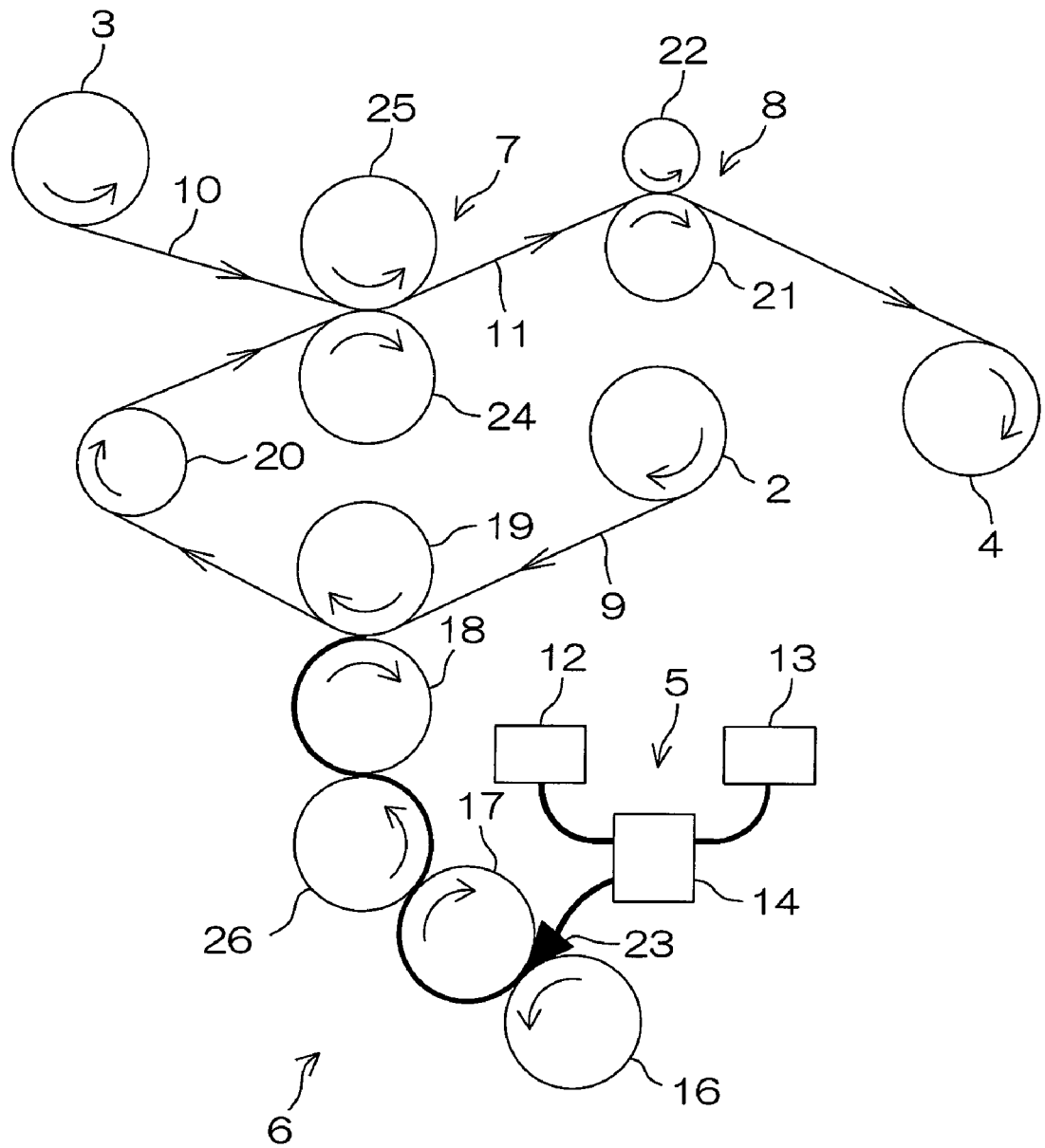
FIG. 2 is a schematic explanatory view showing another embodiment of a solventless laminator adopting a reverse system.

For example, the solventless laminator 1 shown in FIG. 1 is a type of which the adhesive 23 is coated onto the first film 9 with the doctor roll 16, the metering roll 17, the coating roll 18, and the impression roll 19 in the coating unit 6. However, for example, as shown in FIG. 2, the type of which the adhesive 23 is coated onto the first film 9 with the doctor roll 16, the metering roll 17, a cutting roll 26, the coating roll 18, and the impression roll 19 may be used. The same reference numerals are used in FIG. 2 for the same members as those shown in FIG. 1, and the description thereof is omitted.

In FIG. 2, the coating unit 6 includes the doctor roll 16, the metering roll 17, the cutting roll 26, the coating roll 18, and the impression roll 19.

The metering roll 17 is arranged in opposed relation on the downstream side of the doctor roll 16 so as to be in contact with the doctor roll 16. The metering roll 17 rotates in the same direction as the doctor roll 16 in the portion contacting with the doctor roll 16.

The cutting roll 26 is arranged in opposed relation on the downstream side of the metering roll 17 so as to be in contact with the metering roll 17. The cutting roll 26 rotates in the same direction as the metering roll 17 in the portion contacting with the metering roll 17.

The coating roll 18 is arranged in opposed relation on the downstream side of the cutting roll 26 so as to be in contact with the cutting roll 26. The coating roll 18 rotates in the same direction as the cutting roll 26 in the portion contacting with the cutting roll 26.

The film adhered with the solventless laminating adhesive of the present invention is not particularly limited as long as it is a film to be laminated as a composite film, and examples thereof include a metal foil used as a barrier layer and a plastic film used as an inner layer of the bather layer.

The metal that may be used to form the metal foil includes, for example, aluminum, stainless steel, iron, copper, and lead. The metal foil has a thickness of 5 to 100 µm, or preferably 5 to 20 µm.

The plastic that may be used to form the plastic film includes, for example, an olefinic polymer (e.g., polyethylene, polypropylene); a polyester polymer (e.g., polyalkylene terephthalate such as polyethylene terephthalate (PET) and polybutylene terephthalate; polyalkylene naphthalate; and a copolyester that contains these polyalkylene arylate units as main ingredients); a polyamide polymer (e.g., nylon 6, nylon 66); and a vinyl polymer (e.g., polyvinyl chloride, ethylene-vinyl acetate copolymer, ethylene-vinyl alcohol copolymer).

The plastic film also includes a film having inorganic layer formed on at least one side thereof The inorganic layer may be formed by a vacuum evaporation, sputtering, or sol-gel technique. The inorganic substance that may be used to form the inorganic layer includes, for example, an element such as titanium, aluminum, and silicon; or an inorganic compound including the above-mentioned element(s) (e.g., oxide). Specific examples thereof include deposited films such as an aluminum-deposited film and a silica-deposited film.

Moreover, the plastic film may be a laminated composite film (first laminated film) constructed of any co-extruded films or the above-mentioned plastic films which are bonded together.

The plastic film is a non-oriented film (non-oriented polyethylene, non-oriented polypropylene (CPP), etc.), or a uniaxially or biaxially oriented film (biaxially oriented polypropylene, biaxially oriented polyalkylene terephthalate, nylon, etc.) without any particular limitation, and can be appropriately selected according to the purposes.

The plastic film usually has a thickness of 5 to 200 µm.

The surfaces of the metal foil and the plastic film may be subjected to surface treatment, such as corona discharge treatment and primer bonding treatment. Further, the metal foil and the plastic film may be appropriately printed.

These metal foil and plastic film are appropriately used as either the first film 9 or the second film 10 in the above-mentioned solventless laminator 1.

After the composite film 11 obtained by the above-mentioned solventless laminator 1 is wound up by the take-up roll 4, and is thereafter aged at room temperature or under heating, so that the aged film is cured.

The solventless laminator 1 can be used for primary lamination, secondary lamination, or the like without any particular limitation, and for example, the adhesive 23 is coated onto a surface of the barrier layer or a surface of the plastic film by the solventless laminator 1, and the adhesion surfaces are laminated to prepare a primary composite film (primary lamination). Thereafter, the primary composite film is aged at room temperature or under heating (e.g., at 25 to 60° C.), so that the aged film is cured. Subsequently, the adhesive 23 is coated onto a surface of the primary composite film or a surface of the plastic film by the solventless laminator 1, and the adhesion surfaces are laminated to prepare a secondary composite film (secondary lamination). Thereafter, the secondary composite film is aged at room temperature or under heating (e.g., at 25 to 60° C.), so that the aged film is cured.

When the composite film 11 is produced in the above-mentioned manner, the adhesive 23 is coated on the first film 9 by a pair of rolls, namely the coating roll 18 and the impression roll 19, which rotate in the opposite direction to each other. Therefore, during the coating, a shearing force applied by the coating roll 18 and the impression roll 19 can reduce generation of air bubbles and can prevent occurrence of a stringing phenomenon.

The adhesive 23 has an initial viscosity of 500 to 1000 mPa·s three minutes after the curing agent and the base composition are mixed, and a viscosity increase of 100% to 350% relative to the initial viscosity 20 minutes after the mixing. For this reason, coating can be performed at low temperature and high speed with the coating roll 18 and the impression roll 19 that rotate in the opposite direction to each other.

Therefore, although the adhesive 23 is a solventless laminating adhesive, poor appearance of the composite film 11 adhered with such adhesive can be avoided. Besides, since the coating can be performed at low temperature, damage to the first film 9 can be reduced during the coating. Further, since the coating can be performed at high speed, productivity can be improved and deterioration of the working environment resulting from mist can be prevented.

The composite film 11 obtained in the above-mentioned manner has excellent appearance and adhesive strength over a long period of time, even after subjected to high-temperature sterilization treatment, such as hot-water spray treatment, hot-water rotary sterilization treatment or steam rotary sterilization treatment, which is hot water treatment at 100° C. or higher, and is excellent in adhesiveness for lamination, heat-and-humidity resistance, and aptitude for high-temperature sterilization while the occurrence of peeling between the layers can be reduced and without spoiling the content. Therefore, the composite film 11 can be effectively used for producing packaging materials in various industrial fields such as food products, beverages, medical products, and quasi drugs.

EXAMPLES

While in the following, the present invention will be described in further detail with reference to Examples and Comparative Examples, the present invention is not limited to any of them.

Production Example 1

Production of Polyester Polyol A

Into a reactor were fed 286.70 g of isophthalic acid, 193.14 g of neopentyl glycol, and 356.98 g of 1,3-butanediol, and the mixture was subjected to an esterification reaction in a stream of nitrogen at 180 to 220° C. After a predetermined amount of water was distilled off, 174.51 g of sebacic acid, 126.10 g of adipic acid, and 0.04 g of titanium tetrabutoxide were added thereto, and the resulting mixture was subjected to an esterification reaction at 180 to 220° C., to give a polyester polyol A having a number average molecular weight of 500.

Production Example 2

Production of Polyester Polyol B

Fifty grams of 1,3-butanediol was homogenously mixed with 1000 g of the polyester polyol A. Further, 31.5 g of trimellitic anhydride was added thereto, and the resulting mixture was acid-modified at 110° C. to give a polyester polyol B.

Production Example 3

Production of Polyester Polyol C

Thirty grams of trimellitic anhydride was added to 1000 g of the polyester polyol A, and the resulting mixture was acid-modified at 110° C. to give a polyester polyol C.

Production Example 4

Production of Polyester Polyol D

Into a reactor were fed 544.81 g of adipic acid and 604.13 g of diethylene glycol, and the mixture was subjected to an esterification reaction in a stream of nitrogen at 180 to 220° C. After a predetermined amount of water was distilled off, a polyester polyol D having a number average molecular weight of 1000 was obtained.

Production Example 5

Production of Polyester Polyol E

Into a reactor were fed 146.02 g of dimethyl terephthalate, 374.76 g of isophthalic acid, 232.54 g of ethylene glycol, 60.97 g of neopentyl glycol, 199.63 g of 1,6-hexandiol, and 0.10 g of zinc acetate, and the mixture was subjected to an esterification reaction in a stream of nitrogen at 180 to 220° C. After predetermined amounts of water and methanol were distilled off, 164.84 g of adipic acid was added thereto, and the resulting mixture was subjected to an esterification reaction at 180 to 220° C. After completion of the reaction, 0.49 g of phosphoric acid, 14.68 g of silane coupling agent A (epoxysilane, manufactured by Shin-Etsu Chemical Co., Ltd., KBE-403; the same applies to the following), and 4.89 g of silane coupling agent B (aminosilane, manufactured by Shin-Etsu Chemical Co., Ltd., KBE-603; the same applies to the following) were homogenously mixed to give a polyester polyol E having a number average molecular weight of 680.

Production Example 6

Production of Polyester Polyol F

Into a reactor were fed 323.87 g of isophthalic acid and 621.98 g of 1,3-butanediol, and the mixture was subjected to an esterification reaction in a stream of nitrogen at 180 to 220° C. After a predetermined amount of water was distilled off, 284.90 g of adipic acid and 0.10 g of titanium tetrabutoxide were added thereto, and the resulting mixture was subjected to an esterification reaction at 180 to 220° C., to give a polyester polyol F having a number average molecular weight of 500.

Production Example 7

Production of Polyester Polyol G

Into a reactor were fed 199.32 g of dimethyl terephthalate, 511.57 g of isophthalic acid, 237.5 g of ethylene glycol, 64.5 g of neopentyl glycol, 219.57 g of 1,6-hexandiol, and 0.12 g of zinc acetate, and the mixture was subjected to an esterification reaction in a stream of nitrogen at 180 to 220° C. After predetermined amounts of water and methanol were distilled off, 193.2 g of azelaic acid was added thereto, and the resulting mixture was subjected to an esterification reaction at 180 to 220° C. After completion of the reaction, 0.49 g of phosphoric acid, 14.68 g of silane coupling agent A, and 4.89 g of silane coupling agent B were homogenously mixed to give a polyester polyol G having a number average molecular weight of 680.

Production Example 8

Production of Polyurethane Polyol H

Into a reactor were fed 859.53 g of the polyester polyol D and 32.93 g of tolylene diisocyanate (manufactured by Mitsui Chemicals Polyurethanes, Inc., Cosmonate TDI80), and the mixture was subjected to a urethane reaction in a stream of nitrogen at 90 to 95° C. After completion of the reaction, 89.24 g of trifunctional polypropylene glycol (manufactured by Mitsui Chemicals Polyurethanes, Inc., Actcall P-530) having a number average molecular weight of approximately 500, and 17.85 g of silane coupling agent A were mixed with the reaction product to give a polyurethane polyol H.

Production Example 9

Production of Polyurethane Polyol I

Into a reactor were fed 138.41 g of 4,4'-diphenylmethane diisocyanate, 353.14 g of bifunctional polypropylene glycol (manufactured by Mitsui Chemicals Polyurethanes, Inc., Actcall P-400) having a number average molecular weight of approximately 400, 272.34 g of trifunctional polypropylene glycol (manufactured by Mitsui Chemicals Polyurethanes, Inc., Actcall 32-160) having a number average molecular weight of approximately 1000, and 224.45 g of polyoxy tetramethylene glycol (manufactured by Hodogaya Chemical Co., Ltd., PTG-1000) having a number average molecular weight of approximately 1000 and exhibiting crystallinity at room temperature, and the mixture was subjected to a urethane reaction in a stream of nitrogen at 70 to 80° C. After completion of the reaction, 1.48 g of phosphoric acid and 7.91 g of silane coupling agent A were mixed with the reaction product, to give a polyurethane polyol I.

Production Example 10

Production of Polyisocyanate A

Into a reactor were fed 645.94 g of the polyester polyol A and 2461.47 g of xylylene diisocyanate, and the mixture was subjected to a urethane reaction in a stream of nitrogen at 70 to 80° C. Subsequently, xylylene diisocyanate left unreacted was removed by thin-film distillation to give an isocyanate group-terminated urethane prepolymer a. Homogeneously mixed were 600 g of the isocyanate group-terminated urethane prepolymer a, and 400 g of the allophanate/trimer of hexamethylene diisocyanate (manufactured by Mitsui Chemicals Polyurethanes, Inc., TAKENATE D-177N) in a stream of nitrogen at 70° C. to give a polyisocyanate A.

Production Example 11

Production of Polyisocyanate B

Into a reactor were fed 1432.1 g of the polyester polyol A and 2728.7 g of xylylene diisocyanate, and the mixture was subjected to a urethane reaction in a stream of nitrogen at 70 to 80° C. Subsequently, xylylene diisocyanate left unreacted was removed by thin-film distillation, to give an isocyanate group-terminated urethane prepolymer b. Homogeneously mixed were 500 g of the isocyanate group-terminated urethane prepolymer b and 500 g of trimers of hexamethylene diisocyanate (manufactured by Mitsui Chemicals Polyurethanes, Inc., TAKENATE D-170N) in a stream of nitrogen at 70° C. to give a polyisocyanate B.

Production Example 12

Production of Polyisocyanate C

Into a reactor were fed 289.60 g of 4,4'-diphenylmethane diisocyanate, 289.60 g of a mixture of 4,4'-diphenylmethane diisocyanate and 2,2'-diphenylmethane diisocyanate (manufactured by BASF, Lupranate MI), 0.05 g of ortho-toluene sulfonamide, and 420.80 g of the polyester polyol D, and the mixture was subjected to a urethane reaction in a stream of nitrogen at 70 to 75° C. to give a polyisocyanate C.

Production Example 13

Production of Polyisocyanate D

Into a reactor were fed 389.78 g of 4,4'-diphenylmethane diisocyanate, 144.03 g of bifunctional ethylene oxide-propyrene oxide copolymer (manufactured by Mitsui Chemicals Polyurethanes, Inc., Takelac P-24) having a number average molecular weight of approximately 2000, 133.50 g of bifunctional polypropylene glycol (manufactured by Mitsui Chemicals Polyurethanes, Inc., Actcall 22-110) having a number average molecular weight of approximately 1000, 105.13 g of trifunctional polypropylene glycol (manufactured by Mitsui Chemicals Polyurethanes, Inc., Actcall 32-160) having a number average molecular weight of approximately 1000, 205.82 g of polyoxy tetramethylene glycol (manufactured by Hodogaya Chemical Co., Ltd., PTG-1000) having a number average molecular weight of approximately 1000 and exhibiting crystallinity at room temperature, and 0.03 g of ortho-toluene sulfonamide, and the mixture was subjected to a urethane reaction in a stream of nitrogen at 70 to 80° C. After completion of the reaction, 21.52 g of silane coupling agent C (isocyanatesilane, manufactured by Shin-Etsu Chemical Co., Ltd., KBE-9007; the same applies to the following) was mixed with the reaction product to give a polyisocyanate D.

Production Example 14

Production of Polyisocyanate E

Into a reactor were fed 645.94 g of the polyester polyol F and 2461.47 g of xylylene diisocyanate, the mixture was subjected to a urethane reaction in a stream of nitrogen at 70 to 80° C. Subsequently, xylylene diisocyanate left unreacted was removed by thin-film distillation to give an isocyanate group-terminated urethane prepolymer e. Homogeneously mixed were 600 g of the isocyanate group-terminated urethane prepolymer e and 330 g of trimers of hexamethylene diisocyanate (manufactured by Mitsui Chemicals Polyurethanes, Inc., TAKENATE D-170N) in a stream of nitrogen at 70° C. to give a polyisocyanate E.

Production Example 15

Production of Polyisocyanate F

Homogeneously mixed were 750 g of biuret-modified xylylene diisocyanate produced by desolvating TAKENATE A-14 (a solution of biuret-modified xylylene diisocyanate/ ethyl acetate, manufactured by Mitsui Chemicals Polyurethanes, Inc.), 250 g of an allophanate/trimer of hexamethylene diisocyanate (manufactured by Mitsui Chemicals Polyurethanes, Inc., TAKENATE D-177N) in a stream of nitrogen at 50° C. to give a polyisocyanate F.

Preparation in Examples and Comparative Examples

The polyol components B, C, E, H, and I, and the polyisocyanate components A, B, C, D, E and F, all obtained in the above Production Examples, were blended as shown in Table 1 to prepare solventless adhesives for lamination. As for the thus-prepared solventless adhesives for lamination, viscosity was measured in the following manner. Further, the thus-prepared solventless adhesives for lamination were used to prepare composite films in the following manner, and the respective composite films were evaluated as follows.

In Table 1, both the number average molecular weight of each polyol component, and the isocyanate group equivalent weight and the number average molecular weight of each polyisocyanate component were written.

1) Viscosity Measurement after Mixing

In Examples and Comparative Examples, the polyol component and the polyisocyanate component were mixed at the coating temperature shown in Table 1, and the viscosity (initial viscosity) three minutes after the mixing and the viscosity 20 minutes after the mixing were measured by a cone and plate viscometer. The viscosity increase of the initial viscosity 20 minutes after the mixing was calculated. The results are shown in Table 1.

appearance of the unwound area was observed to evaluate the appearance of the film after the aging step. Incidentally, the appearance immediately after the lamination step means the appearance observed at not more than 5 minutes after the lamination step is completed. The results are shown in Table 1.

Evaluation criteria are shown below.

(Evaluation Criteria Immediately After Lamination)

I: The appearance was good with wetting uniformly.

II: There were small dots that did not look wet or the coating surface was partially discolored.

III: There were large dots that did not look wet.

(Evaluation Criteria After Aging)

I: The appearance was good with wetting uniformly.

II: With wetting uniformly, there were small dots that did not look wet, or the coating surface was partially discolored.

III: There were large dots that did not look wet.

TABLE 1

|  | Example of Blending | | | | | | |
|---|---|---|---|---|---|---|---|
|  | 1 | 2 | 3 | 4 | 5 | 6 | 7 |
| Polyol Component | B | H | H | E | G | C | I |
| Number Average Molecular Weight | 420 | 880 | 880 | 680 | 1200 | 548 | 1060 |
| Part by Weight | 50 | 50 | 100 | 100 | 100 | 80 | 50 |
| Polyisocyanate Component | A | C | C | E | F | B | D |
| Isocyanate Group Equivalent Weight | 323 | 298 | 298 | 264 | 268 | 298 | 487 |
| Number Average Molecular Weight | 710 | 745 | 745 | 528 | 570 | 745 | 1042 |
| Part by Weight | 100 | 100 | 100 | 80 | 30 | 100 | 100 |

|  | Ex./Comp. Ex. | | | | | | | | | |
|---|---|---|---|---|---|---|---|---|---|---|
|  | Ex. 1 | Ex. 2 | Ex. 3 | Ex. 4 | Comp. Ex. 1 | Comp. Ex. 2 | Comp. Ex. 3 | Comp. Ex. 4 | Comp. Ex. 5 | Comp. Ex. 6 |
| Coating Temperature (° C.) | 60 | 50 | 50 | 80 | 85 | 50 | 60 | 65 | 70 | 80 |
| Initial Viscosity After Mixing (mPa · s) | 890 | 960 | 500 | 800 | 2000 | 1260 | 750 | 1040 | 840 | 700 |
| Viscosity 20 min. After Mixing (mPa · s) | 3280 | 2202 | 2200 | 2570 | 4300 | 6170 | 4800 | 1930 | 1460 | 3500 |
| Viscosity Increase 20 min. After Mixing (%) | 269 | 129 | 340 | 221 | 115 | 390 | 540 | 86 | 74 | 400 |
| Evaluation Immediately After Lamination | I | I | I | II | III | II | III | II | II | III |
| After Aging | I | I | I | I | III | III | III | III | III | III |

2) Preparation of Composite Film

A composite film composed of two layers, one of the PET film and the other of aluminum-deposited CPP film, was fabricated by the following steps: coating each of the solventless adhesives for lamination in Examples and Comparative Examples onto a white-printed PET film (thickness: 12 μm, printed ink: manufactured by Toyo Ink Mfg. Co., Ltd., NEW LP super R630 white one-component type) using a laminating machine for solventless adhesives (manufactured by Okazaki Machine Industry Co., Ltd., TNS-400-200) in a reverse coating mode at the coating temperature shown in Talbe 1 and at a coating speed of 200 m/minute such that the coating amount of the adhesive was 1.8 to 2.2 g/m²; and bonding the film thus coated and approximately 300 m of aluminum-deposited CPP (thickness: 25 μm, manufactured by Tohcello Co., Ltd., MLCP-WA) together.

3) Evaluation of the Appearance of the Composite Film

The appearance of the composite film thus obtained was observed immediately after the lamination step. Then, the roll of the composite film was subjected to aging at 40° C. for three days. After the aging step was complete, approximately 30 m of the composite film was unwound from the roll, the While the illustrative embodiments of the present invention are provided in the above description, such is for illustrative purpose only and it is not to be construed restrictively. Modification and variation of the present invention that will be obvious to those skilled in the art is to be covered by the following claims.

INDUSTRIAL APPLICABILITY

The solventless laminating adhesive of the present invention is suitable for production of composite films for producing packaging materials in various industrial fields such as food products, beverages, medical products, and quasi drugs.

The invention claimed is:

1. A process for producing a composite film, comprising:
preparing a coating apparatus provided with a pair of rolls opposed to each other, each of the rolls rotating in an opposite direction in the opposed portion, and
coating onto a film passing through between the rolls a solventless laminating adhesive
comprising a polyisocyanate component (A) and a polyol component (B), the polyisocyanate component (A) containing a urethane prepolymer (A1) having an isocyanate group at its molecular terminal and obtained by urethane reaction of a polyisocyanate monomer (a) and a polyol component (b), and the polyol component (B) and the polyol component (b) as a material of the urethane prepolymer (A1) exhibiting no crystallinity at room temperature; and having an initial viscosity of 500 to 1000 mPa·s three minutes after the polyisocyanate component (A) and the polyol component (B) are mixed, and a viscosity increase of 100% to 350% relative to the initial viscosity 20 minutes after the mixing.

2. A process for producing a composite film according to claim 1, wherein the film is coated at 40 to 80° C.

3. A process for producing a composite film according to claim 1, wherein a coating speed of the film is 150 m/minute or higher.

* * * * *